(12) United States Patent
Lee et al.

(10) Patent No.: US 12,297,343 B2
(45) Date of Patent: May 13, 2025

(54) ACRYLIC-BASED COPOLYMER COMPOSITION, METHOD FOR PREPARING THE SAME AND ACRYLIC-BASED RUBBER COMPOSITION

(71) Applicant: LG Chem, Ltd., Seoul (KR)

(72) Inventors: Se Eun Lee, Daejeon (KR); Byoung Yun Kim, Daejeon (KR); Hyung Woon Yoon, Daejeon (KR); Woo Seok Choi, Daejeon (KR); In Sung Jo, Daejeon (KR); Jae Min Lee, Daejeon (KR)

(73) Assignee: LG Chem, Ltd., Seoul (KR)

( * ) Notice: Subject to any disclaimer, the term of this patent is extended or adjusted under 35 U.S.C. 154(b) by 717 days.

(21) Appl. No.: 17/051,325

(22) PCT Filed: Dec. 23, 2019

(86) PCT No.: PCT/KR2019/018279
§ 371 (c)(1),
(2) Date: Oct. 28, 2020

(87) PCT Pub. No.: WO2020/145551
PCT Pub. Date: Jul. 16, 2020

(65) Prior Publication Data
US 2021/0047506 A1    Feb. 18, 2021

(30) Foreign Application Priority Data

Jan. 7, 2019 (KR) .......... 10-2019-0001943

(51) Int. Cl.
*C08L 33/06* (2006.01)
*C08F 220/18* (2006.01)
*C08F 220/28* (2006.01)

(52) U.S. Cl.
CPC ...... *C08L 33/066* (2013.01); *C08F 220/1804* (2020.02); *C08F 220/281* (2020.02); *C08L 2205/025* (2013.01); *C08L 2312/00* (2013.01)

(58) Field of Classification Search
CPC .................................................... C08L 33/066
See application file for complete search history.

(56) References Cited

U.S. PATENT DOCUMENTS

| | | | | | |
|---|---|---|---|---|---|
| 4,228,265 | A | * | 10/1980 | Ohishi | C08F 220/1802 525/329.2 |
| 4,268,636 | A | * | 5/1981 | Iizuka | C08L 27/06 525/85 |
| 4,303,560 | A | * | 12/1981 | Takahashi | C08L 33/14 524/451 |
| 4,740,553 | A | * | 4/1988 | Maeda | C08L 33/08 525/82 |
| 4,774,291 | A | * | 9/1988 | Maeda | C08L 25/08 525/218 |
| 2001/0056153 | A1 | | 12/2001 | Nakagome | |
| 2005/0165191 | A1 | | 7/2005 | Kobayashi et al. | |
| 2005/0250913 | A1 | | 11/2005 | Masuda et al. | |
| 2006/0167159 | A1 | * | 7/2006 | Kubota | C08K 3/36 524/439 |
| 2008/0071014 | A1 | | 3/2008 | Ohishi et al. | |
| 2009/0176909 | A1 | * | 7/2009 | Benz | G02B 1/043 525/218 |
| 2015/0284558 | A1 | | 10/2015 | Mochida et al. | |
| 2016/0289514 | A1 | * | 10/2016 | Kurian | C09J 11/08 |
| 2017/0121439 | A1 | * | 5/2017 | Emori | C08K 5/378 |

FOREIGN PATENT DOCUMENTS

| | | |
|---|---|---|
| CN | 1608085 A | 4/2005 |
| CN | 1659195 A | 8/2005 |
| CN | 1972996 A | 5/2007 |
| CN | 101812180 A | 8/2010 |
| CN | 102030862 A | 4/2011 |
| JP | H05112617 A | 5/1993 |
| JP | H06145257 A | 5/1994 |
| JP | H1112427 A | 1/1999 |
| JP | H11158343 A | 6/1999 |
| JP | 2003277571 A | 10/2003 |
| KR | 940003262 B1 | 4/1994 |
| KR | 970042786 A | 7/1997 |
| KR | 20100109741 A | 10/2010 |
| KR | 20160107356 A | 9/2016 |

OTHER PUBLICATIONS

Thermal Transitions of Homopolymers, flyer (Year: NA).*
Extended European Search Report for Application No. 19908871.7 dated Oct. 11, 2021, pp. 1-9.
International Search Report for Application No. PCT/KR2019/018279, mailed Mar. 31, 2020, pp. 1-2.
Search Report for Chinese Application No. 2019800286349 dated Nov. 12, 2021. 2 pgs.

* cited by examiner

*Primary Examiner* — Irina Krylova
(74) *Attorney, Agent, or Firm* — Lerner David LLP

(57) ABSTRACT

Provided are an acrylic-based copolymer composition, a method of preparing the same, and an acrylic-based rubber composition obtained from the acrylic-based copolymer composition. Specifically, an acrylic-based copolymer composition prepared by polymerizing the acrylic-based copolymers each at high and low temperatures and mixing the acrylic-based copolymers, thereby having improved processability is provided.

14 Claims, No Drawings

ACRYLIC-BASED COPOLYMER COMPOSITION, METHOD FOR PREPARING THE SAME AND ACRYLIC-BASED RUBBER COMPOSITION

CROSS-REFERENCE TO RELATED APPLICATIONS

The present application is a national stage entry under U.S.C. § 371 of International Application No. PCT/KR2019/018279 filed on Dec. 23, 2019, which claims priority to Korean Patent Application No. 10-2019-0001943 filed on Jan. 7, 2019, the disclosures of which are incorporated herein by reference in their entirety.

TECHNICAL FIELD

The present invention relates to an acrylic-based copolymer composition capable of obtaining an acrylic-based rubber composition having excellent mechanical properties and heat resistance, and a method of preparing the same.

BACKGROUND ART

An acrylic-based copolymer has excellent heat resistance and oil resistance, and is thus used as an adhesive, together with rubber materials such as a seal, a hose, a tube, and a belt.

The method of preparing such an acrylic-based copolymer may include a method of polymerizing ethyl acrylate having a high glass transition temperature, and butyl acrylate and methoxy ethyl acrylate having a low glass transition temperature. The acrylic-based copolymer prepared by the method described above may secure low temperature flexibility, oil resistance, and heat resistance, but has a low glass transition temperature to cause a viscosity decrease and a roll sticking phenomenon, resulting in poor processability.

In order to solve the problems, a method of adding a polyester-based oil or the like as a plasticizer has been attempted in the preparation of an acrylic-based copolymer. However, the method is effective only when a plasticizer is added in a large amount, and the method decreases Mooney viscosity, mechanical properties, and heat resistance of the entirety of a mixture.

Accordingly, there is a demand for a method for obtaining an acrylic-based copolymer capable of increasing oil resistance, heat resistance and mechanical properties, while having excellent processability.

DISCLOSURE

Technical Problem

An object of the present invention is to provide an acrylic-based copolymer composition capable of increasing oil resistance, heat resistance and mechanical properties of an acrylic-based rubber composition while improving processability in the preparation of an acrylic-based copolymer, and a method of preparing the same.

Technical Solution

In one general aspect, a method of preparing an acrylic-based copolymer composition includes: preparing a first acrylic-based copolymer by polymerizing a (meth)acrylic acid alkyl ester monomer and a (meth)acrylic acid alkoxy alkyl ester monomer at a temperature of less than 30° C. (S10); preparing a second acrylic-based copolymer by polymerizing a (meth)acrylic acid alkyl ester monomer, a (meth)acrylic acid alkoxy alkyl ester monomer, and a crosslinkable monomer at a temperature of 30° C. or more (S20); and mixing the first acrylic-based copolymer and the second acrylic-based copolymer (S30).

In another general aspect, an acrylic-based copolymer composition includes: a first acrylic-based copolymer including a (meth)acrylic acid alkyl ester monomer-derived repeating unit and a (meth)acrylic acid alkoxy alkyl ester monomer-derived repeating unit; and a second acrylic-based copolymer including a (meth)acrylic acid alkyl ester monomer-derived repeating unit, a (meth)acrylic acid alkoxy alkyl ester monomer-derived repeating unit, and a crosslinkable monomer-derived repeating unit.

In another general aspect, there is provided an acrylic-based rubber composition including the acrylic-based copolymer composition as described above, wherein the acrylic-based rubber composition has a crosslinking density of 17.2 kgf•m or more.

Advantageous Effects

According to the present invention, the acrylic-based copolymer composition is prepared by mixing the first acrylic-based copolymer polymerized at a low temperature and the second acrylic-based copolymer polymerized at a high temperature, such that the acrylic-based copolymer composition having uniform mixing or dispersion and having an appropriate viscosity (Mooney viscosity) can be obtained. Accordingly, according to the preparation method according to the present invention, the acrylic-based copolymer composition having excellent processability, and the acrylic-based rubber composition having excellent oil resistance, heat resistance, and mechanical properties can be obtained.

BEST MODE

The terms and words used in the detailed description and claims of the invention should not be interpreted as being limited to conventional or dictionary meanings, but should be interpreted as having meanings and concepts meeting the technical ideas of the present invention based on a principle that the inventors can appropriately define the concepts of terms in order to describe their own inventions in the best mode.

The term "derived repeating unit" as used herein may refer to a component, a structure, or a material itself resulting from certain materials. As a specific example, the term "derived repeating unit" may refer to a repeating unit in which a monomer added in the polymerization process participates in the polymerization reaction and is formed in the acrylic-based copolymer.

The term "rubber" as used herein may refer to a plastic material having elasticity, and may refer to rubber, an elastomer, or synthetic latex.

Hereinafter, the present invention will be described in detail.

A method of preparing an acrylic-based copolymer composition according to the present invention includes preparing a first acrylic-based copolymer by polymerizing a (meth)acrylic acid alkyl ester monomer and a (meth)acrylic acid alkoxy alkyl ester monomer at a temperature of less than 30° C. (S10); preparing a second acrylic-based copolymer by polymerizing a (meth)acrylic acid alkyl ester monomer, a (meth)acrylic acid alkoxy alkyl ester monomer, and a crosslinkable monomer at a temperature of 30° C. or more (S20); and mixing the first acrylic-based copolymer and the second acrylic-based copolymer (S30).

When the first acrylic-based copolymer is polymerized at a high temperature (i.e., 30° C. or more), it is difficult to prepare a first acrylic-based copolymer having a uniform structure since an initial polymerization reaction rate is high so that monomers are rapidly bonded to each other at the start of the reaction. In addition, when the second acrylic-based copolymer is polymerized at a low temperature (i.e., less than 30° C.), it is difficult to prepare a second acrylic-based copolymer having a uniform structure since crosslinkable monomers are non-uniformly bonded to each other at the end of a polymerization conversion.

In the method of preparing an acrylic-based copolymer composition according to the present invention, however, it is possible to prepare a high viscosity first acrylic-based copolymer having a uniform structure since the first acrylic-based copolymer is prepared at a relatively low polymerization temperature (i.e., less than 30° C.), and it is possible to prepare a low viscosity second acrylic-based copolymer having a uniform structure since the second acrylic-based copolymer is prepared at a relatively high polymerization temperature (i.e., 30° C. or more).

As such, when the high viscosity first acrylic-based copolymer having a uniform structure is mixed with the low viscosity second acrylic-based copolymer having a uniform structure, the low viscosity second acrylic-based copolymer may be uniformly distributed around the high viscosity first acrylic-based copolymer, whereby a mixture (an acrylic-based copolymer composition) that is uniformly mixed (or dispersed) and has a Mooney viscosity range capable of increasing the processability of the acrylic-based copolymer composition may be obtained. In addition, the acrylic-based rubber composition is prepared from the acrylic-based copolymer composition of the present invention including the mixture, such that it is possible to obtain an acrylic-based rubber composition having excellent oil resistance, heat resistance, and mechanical properties.

According to an exemplary embodiment of the present invention, the polymerization temperature in step (S10) may be less than 30° C., 5° C. to 15° C., or 8° C. to 12° C. By polymerizing at the polymerization temperature in the range as described above, the first acrylic-based copolymer having a uniform structure may be prepared, thereby making it possible to increase the processability of an acrylic-based copolymer composition.

In addition, according to an exemplary embodiment of the present invention, the polymerization temperature in step (S20) may be 30° C. or more, 30° C. to 50° C., or 35° C. to 45° C. By polymerizing at the polymerization temperature in the range as described above, the second acrylic-based copolymer having a uniform structure may be prepared, thereby making it possible to increase the processability of an acrylic-based copolymer composition.

The polymerizations each in step (S10) and step (S20) may be achieved by a method such as emulsion polymerization, bulk polymerization, suspension polymerization, or solution polymerization. Specifically, the polymerization may be achieved by an emulsion polymerization method in a state in which an additive such as a polymerization initiator, an emulsifier, a polymerization terminator, ion exchanged water, a molecular weight regulator, an activator, or a redox catalyst is added.

As the polymerization initiator, inorganic peroxides such as sodium persulfate, potassium persulfate, ammonium persulfate, potassium perphosphate or hydrogen peroxide; organic peroxides such as diisopropylbenzene hydroperoxide, t-butyl hydroperoxide, cumene hydroperoxide, p-menthane hydroperoxide, di-t-butyl peroxide, t-butylcumyl peroxide, acetyl peroxide, isobutyl peroxide, octanoyl peroxide, benzoyl peroxide, 3,5,5-trimethylhexanol peroxide, or t-butyl peroxy isobutylate; or nitrogen compounds such as azobis isobutyronitrile, azobis-2,4-dimethyl valeronitrile, azobis cyclohexanecarbonitrile, or azobis methyl isobutyrate may be used alone or in combination of two or more thereof.

Here, when the organic peroxides or the inorganic peroxides are used as a polymerization initiator, they may be used in combination with a reducing agent. As the reducing agent, compounds containing metal ions in a reduced state such as ferrous sulfate or cuprous naphthenate; sulfonic acid compounds such as sodium methanesulfonate; or amine compounds such as dimethylaniline may be used alone or in combination of two or more thereof.

As the emulsifier, nonionic emulsifiers such as polyoxyethylene alkyl ether, polyoxyethylene alkylphenol ether, polyoxyethylene alkyl ester, or polyoxyethylene sorbitan alkyl ester; anionic emulsifiers, for example, salts of fatty acids such as myristic acid, palmitic acid, oleic acid, or linolenic acid, alkyl benzene sulfonate salts such as sodium dodecyl benzene sulfonate, higher alcohol sulfate ester salts, or alkylsulfosuccinate salts; cationic emulsifiers such as alkyl trimethyl ammonium chloride, dialkylammonium chloride, or benzyl ammonium chloride; or copolymerizable emulsifiers such as sulfo esters of $\alpha,\beta$-unsaturated carboxylic acids, sulfate esters of $\alpha,\beta$-unsaturated carboxylic acids, or sulfo alkyl aryl ethers may be used alone or in combination of two or more thereof.

As the molecular weight regulator, mercaptans such as a-methylstyrene dimer, t-dodecyl mercaptan, n-dodecyl mercaptan, or octyl mercaptan; halogenated hydrocarbons such as carbon tetrachloride, methylene chloride, or methylene bromide; or sulfur-containing compounds such as tetraethyl thiuram disulfide, dipentamethylene thiuram disulfide, or diisopropylxanthogen disulfide may be used.

As the activator, sodium hydrosulfite, sodium formaldehyde sulfoxylate, sodium ethylenediamine tetraacetate, ferrous sulfate, lactose, dextrose, sodium linoleate, or sodium sulfate may be used alone or in combination of two or more thereof.

As the redox catalyst, sodium formaldehyde sulfoxylate, ferrous sulfate, disodium ethylenediaminetetraacetate, or cupric sulfate may be used alone or in combination of two or more thereof.

The (meth)acrylic acid alkyl ester monomer in step (S10) and step (S20), which forms a main chain in each of the first and second acrylic-based copolymers, may be a (meth)acrylic acid alkyl ester monomer containing a linear or cyclic alkyl group having 1 to 8 carbon atoms. Here, the alkyl group contained in the (meth)acrylic acid alkyl ester monomer may be unsubstituted or substituted with a hydroxyl group (OH).

Specifically, as the (meth)acrylic acid alkyl ester monomer in step (S10), methyl (meth)acrylate, ethyl (meth)acrylate, propyl (meth)acrylate, isopropyl (meth)acrylate, n-butyl (meth)acrylate, isobutyl (meth)acrylate, n-amyl (meth)acrylate, isoamyl (meth)acrylate, n-hexyl (meth)acrylate, 2-ethylhexyl (meth)acrylate, cyclohexyl (meth)acrylate, hydroxy methyl (meth)acrylate, hydroxy ethyl (meth)acrylate, or hydroxypropyl (meth)acrylate may be used alone or in combination of two or more thereof. More specifically, the (meth)acrylic acid alkyl ester monomer in step (S10) may be a combination of ethyl (meth)acrylate, butyl (meth)acrylate, and hydroxypropyl (meth)acrylate.

Further, as the (meth)acrylic acid alkyl ester monomer in step (S20), methyl (meth)acrylate, ethyl (meth)acrylate, propyl (meth)acrylate, isopropyl (meth)acrylate, n-butyl (meth)acrylate, isobutyl (meth)acrylate, n-amyl (meth)acrylate, isoamyl (meth)acrylate, n-hexyl (meth)acrylate, 2-ethylhexyl (meth)acrylate, or cyclohexyl (meth)acrylate may be used alone or in combination of two or more thereof. More specifically, the (meth)acrylic acid alkyl ester monomer in step (S20) may be a combination of ethyl (meth)acrylate and butyl (meth)acrylate.

The (meth)acrylic acid alkoxy alkyl ester monomer in step (S10) and step (S20), which forms a main chain in each of the first and second acrylic-based copolymers, may be a (meth)acrylic acid alkoxy alkyl ester monomer containing an alkoxy alkyl group having 1 to 8 carbon atoms. As such (meth)acrylic acid alkoxy alkyl ester monomer, methoxymethyl (meth)acrylate, ethoxymethyl (meth)acrylate, 2-ethoxyethyl (meth)acrylate, 2-butoxyethyl (meth)acrylate, 2-methoxyethyl (meth)acrylate, 2-propoxyethyl (meth)acrylate, 3-methoxypropyl (meth)acrylate, or 4-methoxybutyl (meth)acrylate may be used alone or in combination of two or more thereof. Specifically, the (meth)acrylic acid alkoxy alkyl ester monomer may be 2-methoxyethyl (meth)acrylate.

The crosslinkable monomer in step (S20), which is for imparting a crosslinkable functional group in the preparation of the second acrylic-based copolymer, may be an epoxy group-containing monomer or a halogen-containing monomer.

As the epoxy group-containing monomer, glycidyl (meth)acrylate, vinyl glycidyl ether, allyl glycidyl ether, or methacryl glycidyl ether may be used alone or in combination of two or more thereof.

As the halogen-containing monomer, vinyl chloro acetate, vinyl bromo acetate, allyl chloro acetate, vinyl chloro propionate, vinyl chloro butyrate, vinyl bromo butyrate, 2-chloro ethyl acrylate, 3-chloro propyl acrylate, 4-chloro butyl acrylate, 2-chloro ethyl methacrylate, 2-bromo ethyl acrylate, 2-iodine ethyl acrylate, 2-chloro ethyl vinyl ether, chloro methyl vinyl ether, 4-chloro-2-butenyl acrylate, vinyl benzyl chloride, 5-chloro methyl-2-norbornene, or 5-chloroacetoxy methyl-2-norbornene may be used alone or in combination of two or more thereof. Specifically, the halogen-containing monomer may be vinyl chloro acetate.

According to an exemplary embodiment of the present invention, step (S10) and step (S20) may be performed individually or simultaneously. That is, step (S20) may be performed after step (S10), or step (S10) may be performed after step (S20), or step (S10) and step (S20) may be simultaneously performed.

According to an exemplary embodiment of the present invention, a mixing ratio of the first acrylic-based copolymer and the second acrylic-based copolymer in step (S30) may be 3:7 to 7:3 by weight, 4:6 to 6:4 by weight, or 1:1 by weight. The first acrylic-based copolymer is mixed with the second acrylic-based copolymer in the range as described above, such that the acrylic-based copolymer composition capable of forming an acrylic-based rubber composition having excellent heat resistance and mechanical properties, while improving the processability thereof, may be prepared.

Meanwhile, since the first acrylic-based copolymer and the second acrylic-based copolymer are in a latex state, the present invention may obtain the acrylic-based copolymer composition in which the first acrylic-based copolymer and the second acrylic-based copolymer are easily mixed and uniformly mixed (or dispersed).

The acrylic-based copolymer composition according to the present invention includes a first acrylic-based copolymer including a (meth)acrylic acid alkyl ester monomer-derived repeating unit and a (meth)acrylic acid alkoxy alkyl ester monomer-derived repeating unit; and a second acrylic-based copolymer including a (meth)acrylic acid alkyl ester monomer-derived repeating unit, a (meth)acrylic acid alkoxy alkyl ester monomer-derived repeating unit, and a crosslinkable monomer-derived repeating unit.

The (meth)acrylic acid alkyl ester monomer-derived repeating unit included in the first acrylic-based copolymer is derived from the (meth)acrylic acid alkyl ester monomer as described above, and serves to increase the low temperature flexibility, oil resistance, and heat resistance of the acrylic-based rubber composition. The content of such (meth)acrylic acid alkyl ester monomer-derived repeating unit may be 80 parts by weight to 95 parts by weight, 80 parts by weight to 90 parts by weight, or 85 parts by weight to 87 parts by weight, based on 100 parts by weight of the total monomer-derived repeating units. The content of the (meth)acrylic acid alkyl ester monomer-derived repeating unit is in the range as described above, such that the elasticity of the first acrylic-based copolymer may be improved, thereby increasing the crosslinking density.

The (meth)acrylic acid alkoxy alkyl ester monomer-derived repeating unit included in the first acrylic-based copolymer is derived from the (meth)acrylic acid alkoxy alkyl ester monomer as described above, and serves to increase the low temperature flexibility, oil resistance, and heat resistance of the acrylic-based rubber composition. The content of such (meth)acrylic acid alkoxy alkyl ester monomer-derived repeating unit may be 5 parts by weight to 20 parts by weight, 10 parts by weight to 17 parts by weight, or 13 parts by weight to 15 parts by weight, based on 100 parts by weight of the total monomer-derived repeating units. The content of the (meth)acrylic acid alkoxy alkyl ester monomer-derived repeating unit is in the range as described above, such that the elasticity of the first acrylic-based copolymer may be improved, thereby increasing the crosslinking density.

Such first acrylic-based copolymer may have a weight average molecular weight of 150,000 g/mol to 1,100,000 g/mol, 200,000 g/mol to 1,000,000 g/mol, or 250,000 g/mol to 900,000 g/mol. The weight average molecular weight of the first acrylic-based copolymer is in the range as described above, such that the heat resistance and mechanical properties of the acrylic-based rubber composition as well as the processability of the acrylic-based copolymer composition may be increased.

The (meth)acrylic acid alkyl ester monomer-derived repeating unit included in the second acrylic-based copolymer is derived from the (meth)acrylic acid alkyl ester monomer as described above, and serves to increase the low temperature flexibility, oil resistance, and heat resistance of the acrylic-based rubber composition. The content of such (meth)acrylic acid alkyl ester monomer-derived repeating unit may be 75 parts by weight to 95 parts by weight, 80 parts by weight to 90 parts by weight, or 82 parts by weight to 85 parts by weight, based on 100 parts by weight of the total monomer-derived repeating units. The content of the (meth)acrylic acid alkyl ester monomer-derived repeating unit is in the range as described above, such that the elasticity of the second acrylic-based copolymer may be improved, thereby increasing the crosslinking density.

The (meth)acrylic acid alkoxy alkyl ester monomer-derived repeating unit included in the second acrylic-based copolymer is derived from the (meth)acrylic acid alkoxy alkyl ester monomer as described above, and serves to increase the low temperature flexibility, oil resistance, and heat resistance of the acrylic-based rubber composition. The content of such (meth)acrylic acid alkoxy alkyl ester monomer-derived repeating unit may be 4 parts by weight to 20 parts by weight, 8 parts by weight to 17 parts by weight, or 12 parts by weight to 15 parts by weight, based on 100 parts by weight of the total monomer-derived repeating units. The content of the (meth)acrylic acid alkoxy alkyl ester monomer-derived repeating unit is in the range as described above, such that the elasticity of the second acrylic-based copolymer may be improved, thereby increasing the crosslinking density.

The crosslinkable monomer-derived repeating unit included in the second acrylic-based copolymer is derived from the crosslinkable monomer as described above, and serves to increase crosslinkability and heat resistance of the acrylic-based rubber composition. The content of such crosslinkable monomer-derived repeating unit may be 1 part by weight to 10 parts by weight, 2 parts by weight to 8 parts by weight, or 3 parts by weight to 5 parts by weight, based on 100 parts by weight of the total monomer-derived repeating units. The content of the crosslinkable monomer-derived repeating unit is in the range as described above, such that the crosslinking rate may be improved in the preparation of the second acrylic-based copolymer, thereby increasing the crosslinking density.

Such second acrylic-based copolymer may have a weight average molecular weight of 50,000 g/mol to 900,000 g/mol, 100,000 g/mol to 800,000 g/mol, or 150,000 g/mol to 700,000 g/mol. The weight average molecular weight of the second acrylic-based copolymer is in the range as described above, such that the heat resistance and mechanical properties of the acrylic-based rubber composition as well as the processability of the acrylic-based copolymer composition may be increased.

Meanwhile, according to an exemplary embodiment of the present invention, the Mooney viscosity of the first acrylic-based copolymer may be greater than that of the second acrylic-based copolymer. The Mooney viscosity of the first acrylic-based copolymer is greater than that of the second acrylic-based copolymer, such that the mixing between the acrylic-based copolymers is uniform, thereby making it possible to obtain an acrylic-based copolymer composition having excellent processability.

In addition, according to an exemplary embodiment of the present invention, a mixture (an acrylic-based copolymer composition) in which the first acrylic-based copolymer and the second acrylic-based copolymer are mixed, may have a Mooney viscosity ($ML_{1+4}$, 100° C.) of 20 to 80, 25 to 60, or 30 to 50. The Mooney viscosity of the mixture is in the range as described above, such that it is possible to obtain an acrylic-based copolymer composition having excellent processability.

The acrylic-based rubber composition according to the present invention may be obtained from the acrylic-based copolymer composition as described above. Specifically, the acrylic-based rubber composition may be obtained by adding and mixing at least one additive to the acrylic-based copolymer composition as described above followed by heating and crosslinking the mixture.

The additive may be at least one selected from the group consisting of reinforcing agents, anti-aging agents, light stabilizers, plasticizers, lubricants, adhesives, flame retardants, antifungal agents, antistatic agents, and colorants.

The mixing may be achieved by a method such as roll mixing, Banbury mixing, screw mixing, or solution mixing.

This acrylic-based rubber composition according to the present invention may be made into an article by having a required shape through a molding or extrusion process after the completion of the crosslinking, or by curing simultaneously with or subsequently to the crosslinking.

Examples of the article may include a rubber for an engine mount, a transmission seal, a crankshaft seal or the like.

The acrylic-based rubber composition according to the present invention may have a high crosslinking density of 17.2 kgf•m or more, 17.4 kgf•m or more, or 17.5 kgf•m to 18.5 kgf•m by including the acrylic-based copolymer composition as described above. Due to the high crosslinking density of the acrylic-based rubber composition, the articles prepared from the acrylic-based rubber composition of the present invention can have excellent heat resistance and mechanical properties.

Hereinafter, the present invention will be described in detail with reference to the following Examples. However, the following Examples describe the present invention by way of example only. It is apparent to those skilled in the art that various changes and modifications can be made in the scope and spirit of the present invention and that the present invention is not limited thereto.

EXAMPLE 1

1) Preparation of First Acrylic-based Copolymer 33 parts by weight of butyl acrylate, 49 parts by weight of ethyl acrylate, 3.5 parts by weight of 2-hydroxy propyl methacrylate, and 14.5 parts by weight of 2-methoxy ethyl acrylate were mixed to obtain a monomer mixture. The obtained monomer mixture was added to a polymerization reactor, 300 parts by weight of ion-exchanged water, 2.5 parts by weight of an emulsifier (sodium lauryl sulfate), and 0.05 parts by weight of a polymerization initiator (p-menthane hydroperoxide) were added thereto based on 100 parts by weight of the monomer mixture, and polymerization was then started at a temperature of 10° C. Next, when the polymerization conversion reached 90%, the polymerization was stopped and the coagulation was then performed to obtain a first acrylic-based copolymer (26 wt % of solid concentration) in a latex state.

2) Preparation of Second Acrylic-based Copolymer 32 parts by weight of butyl acrylate, 50 parts by weight of ethyl acrylate, 14.5 parts by weight of 2-methoxy ethyl acrylate, and 3.5 parts by weight of vinyl chloro acetate were mixed to obtain a monomer mixture. The obtained monomer mixture was added to a polymerization reactor, 412 parts by weight of ion-exchanged water, 3 parts by weight of an emulsifier (sodium lauryl sulfate), and 0.02 parts by weight of a polymerization initiator (cumene hydroperoxide) were added thereto based on 100 parts by weight of the monomer mixture, and polymerization was then started at a temperature of 30° C. Next, when the polymerization conversion reached 90%, the polymerization was stopped and the coagulation was then performed to obtain a second acrylic-based copolymer (25 wt % of solid concentration) in a latex state.

3) Preparation of Acrylic-based Copolymer Composition and Acrylic-based Rubber Composition The first acrylic-based copolymer and the second acrylic-based copolymer thus prepared were added to the blender in a ratio of 1:1 by weight and stirred at 55° C. for 30 minutes at 300 rpm to prepare a mixture (acrylic-based copolymer composition) in a latex state. Then, 100 parts by weight of the mixture, and 1.0 part by weight of stearic acid, 2.0 parts by weight of an antioxidant, 0.3 parts by weight of sulfur, 0.3 parts by weight of a potassium soap, and 2.5 parts by weight of a sodium soap based on 100 parts by weight of the mixture were added to the blender, and blended at 50° C. for 8 minutes to prepare an acrylic-based rubber composition through a roll mill process.

EXAMPLE 2

Example 2 was performed in the same manner as that in Example 1, except that the polymerization temperature was 5° C. in the preparation of the first acrylic-based copolymer and a polymerization temperature was 50° C. in the preparation of the second acrylic-based copolymer.

EXAMPLE 3

Example 3 was performed in the same manner as that in Example 1, except that the first acrylic-based copolymer and the second acrylic-based copolymer were mixed at a ratio of 4:6 by weight in the preparation of the acrylic-based copolymer composition.

COMPARATIVE EXAMPLE 1

Comparative Example 1 was performed in the same manner as that in Example 1, except that the second acrylic-based copolymer was used alone without using the first acrylic-based copolymer in the preparation of the acrylic-based copolymer composition.

COMPARATIVE EXAMPLE 2

Comparative Example 2 was performed in the same manner as that in Example 1, except that the first acrylic-based copolymer was used alone without using the second acrylic-based copolymer in the preparation of the acrylic-based copolymer composition.

COMPARATIVE EXAMPLE 3

1) Preparation of First' Acrylic-based Copolymer 32 parts by weight of butyl acrylate, 50 parts by weight of ethyl acrylate, 14.5 parts by weight of 2-methoxy ethyl acrylate, and 3.5 parts by weight of vinyl chloro acetate were mixed to obtain a monomer mixture. The obtained monomer mixture was added to a polymerization reactor, 300 parts by weight of ion-exchanged water, 3 parts by weight of an emulsifier (sodium lauryl sulfate), and 0.05 parts by weight of a polymerization initiator (p-menthane hydroperoxide) were added thereto based on 100 parts by weight of the monomer mixture, and polymerization was then started at a temperature of 10° C. Next, when the polymerization conversion reached 90%, the polymerization was stopped and the coagulation was then performed to obtain a first' acrylic-based copolymer (25 wt % of solid concentration) in a latex state.

2) Preparation of Second' Acrylic-based Copolymer 33 parts by weight of butyl acrylate, 49 parts by weight of ethyl acrylate, 3.5 parts by weight of 2-hydroxy propyl methacrylate, and 14.5 parts by weight of 2-methoxy ethyl acrylate were mixed to obtain a monomer mixture. The obtained monomer mixture was added to a polymerization reactor, 250 parts by weight of ion-exchanged water, 2.5 parts by weight of an emulsifier (sodium lauryl sulfate), and 0.02 parts by weight of a polymerization initiator (cumene hydroperoxide) were added thereto based on 100 parts by weight of the monomer mixture, and polymerization was then started at a temperature of 30° C. Next, when the polymerization conversion reached 90%, the polymerization was stopped and the coagulation was then performed to obtain a second' acrylic-based copolymer (25 wt % of solid concentration) in a latex state.

3) Preparation of Acrylic-based Copolymer Composition and Acrylic-based Rubber Composition The first' acrylic-based copolymer and the second' acrylic-based copolymer thus prepared were added to the blender in a ratio of 1:1 by weight and stirred at 55° C. for 30 minutes at 300 rpm to prepare a mixture (acrylic-based copolymer composition) in a latex state. Then, 100 parts by weight of the mixture, and 1.0 part by weight of stearic acid, 2.0 parts by weight of an antioxidant, 0.3 parts by weight of sulfur, 0.3 parts by weight of a potassium soap, and 2.5 parts by weight of a sodium soap based on 100 parts by weight of the mixture were added to the blender, and blended at 50° C. for 8 minutes to prepare an acrylic-based rubber composition through a roll mill process.

EXPERIMENTAL EXAMPLE

The physical properties of the acrylic-based copolymer, the acrylic-based copolymer composition, and the acrylic-based rubber composition prepared in Examples and Comparative Examples were evaluated using the following methods, and the results are shown in Table 1 below.

1. Weight average molecular weight (Mw, g/mol): The weight average molecular weight (Mw) was measured by gel permeation chromatography (GPC: PL GPC220, Agilent Technologies) under the following conditions.

Column: Two PLgel Olexis columns (manufactured by Polymer Laboratories) and one PLgel mixed-C column (manufactured by Polymer Laboratories) were combined and used.

Solvent: 2 wt % of an amine compound in tetrahydrofuran was used in combination.

Flow rate: 1 ml/min

Sample concentration: 0.1%

Column temperature: 34° C.

Detector: Waters 2414 RID

Standard: Polystyrene (corrected by a cubic function)

2. Mooney viscosity ($ML_{1+4}$, 100° C.) and S/R: The Mooney viscosity was measured by a large rotor at a rotor speed of 2±0.02 rpm at 100° C. using a MV-2000 (manufactured by ALPHA Technologies). Here, after samples used were left standing at room temperature (23±3° C.) for 30 minutes or more, 27±3 g of each sample was taken and poured into a die cavity, and the Mooney viscosity was measured for 4 minutes by operating a platen. In addition, a stress relaxation (S/R) value obtained when measuring the Mooney viscosity was confirmed.

3. Crosslinking density (kgf•m): The crosslinking density was measured by the difference between the initial and final torque values using a moving die rheometer (MDR).

4. Processability (10 points): The blend was subjected to a roll mill under the following conditions, and then evaluated by a 10-point method according to the following criteria. Here, the closer to 10 points, the better the processability.

a. Roll initial condition: roller of 50° C., roll gauge of 1 to 4 mm (0.5 mm increments), and sample weight of 400 g.

b. Initial milling was performed for 30 seconds or more, then the roll gauge was increased by 0.5 mm every 5 minutes.

c. The roll gauge where the detachment starts was measured.

1 point: In the case that the roll gauge where the detachment starts is 1 to 2 mm.

5 to 7 points: In the case that the roll gauge where the detachment starts is 3 to 4 mm.

7 to 8 points: In the case that the roll gauge where the detachment starts is 4 to 5 mm.

10 points: In the case that the roll gauge where the detachment starts is 6 mm or more.

5. Hardness (Shore A): It was measured using an automatic hardness tester (manufactured by BAREISS) according to ASTM D 2240.

6. Tensile strength (kgf/cm$^2$): Each specimen was prepared and tensile strength at break of the specimens was measured according to ASTM D 412. Here, the tensile strength was measured at a rate of 50 cm/min using a tensile machine, a Universal Test Machine 4204 (manufactured by Instron).

7. Elongation (%): The elongation at break of the specimen was measured in the tensile strength evaluation as described above.

TABLE 1

| Physical properties | | Example 1 | Example 2 | Example 3 | Comp. Example 1 | Comp. Example 2 | Comp. Example 3 |
|---|---|---|---|---|---|---|---|
| Weight average molecular weight | First acrylic-based copolymer | 871,382 | 990,283 | 860,211 | — | 950,040 | — |
| | Second acrylic-based copolymer | 513,842 | 480,323 | 490,322 | 911,002 | — | — |
| | First' acrylic-based copolymer | — | — | — | — | — | 968,020 |
| | Second' acrylic-based copolymer | — | — | — | — | — | 450,112 |
| Mooney viscosity | Mooney viscosity of first acrylic-based copolymer | 51.9 | 53.2 | 49.8 | — | 34.4 | 52 |
| | Mooney viscosity of second acrylic-based copolymer | 28.1 | 26.3 | 27.7 | 34.2 | — | 24.5 |
| | Mooney viscosity of acrylic-based copolymer composition | 39.1 | 38.5 | 37.2 | — | — | 38.1 |
| | Mooney viscosity of acrylic-based rubber composition | 66.1 | 65.3 | 64.7 | 73 | 59 | 69.3 |
| S/R | | 0.33 | 0.35 | 0.34 | 0.208 | 0.398 | 0.311 |
| Crosslinking density (@180° C., 30 min) | $M_H$ | 17.85 | 18.1 | 17.5 | 12.20 | 11.94 | 16.75 |
| | $T_{s1}$ | 0.77 | 0.81 | 0.72 | 0.26 | 0.09 | 0.19 |
| | $T_{90}$ | 10.8 | 10.5 | 11.1 | 7.38 | 12.21 | 9.8 |
| Processability | | 10 | 10 | 10 | 5-7 | 10 | 7-8 |
| Mechanical properties (@180° C., 15 min) | Hardness | 64 | 65 | 64 | 62 | 61 | 63 |
| | Tensile strength | 110 | 118 | 115 | 99 | 79 | 84 |
| | Elongation | 140 | 150 | 148 | 121 | 181 | 159 |

Referring to Table 1, it could be confirmed that an acrylic-based copolymer composition having excellent processability was obtained when the acrylic-based copolymer composition was prepared using the first acrylic-based copolymer polymerized at a low temperature and the second acrylic-based copolymer polymerized at a high temperature as in the present invention. In addition, it could be confirmed that an acrylic-based rubber composition having excellent mechanical properties and heat resistance (crosslinking density) was obtained when the acrylic-based copolymer composition according to the present invention was used.

On the other hand, it could be confirmed that processability, mechanical properties, and heat resistance were very poor in the case of Comparative Example 1 where the second acrylic-based copolymer polymerized at a high temperature was used alone. In addition, it could be confirmed that mechanical properties (in particular, tensile strength) and heat resistance were poor in the case of Comparative Example 2 where the first acrylic-based copolymer polymerized at a low temperature was used alone. Further, it could be confirmed that processability and mechanical properties (in particular, tensile strength) were poor in the case of Comparative Example 3 where the first' acrylic-based copolymer and the second' acrylic-based copolymer each polymerized at low and high temperatures were used.

The invention claimed is:

1. A method of preparing an acrylic-based copolymer composition, comprising:
   preparing a first acrylic-based copolymer by polymerizing a monomer mixture consisting of a first (meth)acrylic acid alkyl ester monomer having a linear or cyclic alkyl group having 1 to 8 carbon atoms, a second (meth)acrylic acid alkyl ester monomer having a linear or cyclic alkyl group having 1 to 8 carbon atoms and the alkyl group being substituted with a hydroxyl group, and a (meth)acrylic acid alkoxy alkyl ester monomer having an alkoxy alkyl group having 1 to 8 carbon atoms, at a temperature of 5° C. to 15° C.;
   preparing a second acrylic-based copolymer by polymerizing a monomer mixture consisting of a (meth)acrylic acid alkyl ester monomer having a linear or cyclic alkyl group having 2 to 8 carbon atoms, a (meth)acrylic acid alkoxy alkyl ester monomer having an alkoxy alkyl group having 1 to 8 carbon atoms, and a crosslinkable monomer, at a temperature of 30° C. to 50° C., wherein the crosslinkable monomer is at least one selected from the group consisting of an epoxy group-containing monomer and a halogen-containing monomer, the epoxy-containing monomer is at least one selected from the group consisting of glycidyl (meth)acrylate, vinyl glycidyl ether, allyl glycidyl ether, and methacryl glycidyl ether, and the halogen-containing monomer is at least one selected from the group consisting of vinyl chloro acetate, vinyl bromo acetate, allyl chloro acetate, vinyl chloro propionate, vinyl chloro butyrate, vinyl bromo butyrate, 2-chloroethyl acrylate, 3-chloro propyl acrylate, 4-chloro butyl acrylate, 2-chloroethyl methacrylate, 2-bromo ethyl acrylate, 2-iodine ethyl acrylate, 2-chloroethyl vinyl ether, chloro methyl vinyl ether, 4-chloro-2-butenyl acrylate, vinyl benzyl chloride, 5-chloro methyl-2-norbornene, and 5-chloroacetoxy methyl-2-norbornene; and
   mixing the first acrylic-based copolymer and the second acrylic-based copolymer in a ratio of 4:6 to 6:4 by weight in a latex state,
   wherein in the first acrylic-based copolymer, a repeating unit derived from the first (meth)acrylic acid alkyl ester monomer is present in an amount of at least 80 parts by weight, and a combined repeating unit derived from the first (meth)acrylic acid alkyl ester monomer and the second (meth)acrylic acid alkyl ester monomer is present in an amount of 80 parts by weight to 95 parts by weight, and a repeating unit derived from the (meth)acrylic acid alkoxy alkyl ester monomer is present in an amount of 5 parts by weight to 20 parts by weight, based on 100 parts by weight of total repeating units, and
   in the second acrylic-based copolymer, a repeating unit derived from the (meth)acrylic acid alkyl ester monomer is present in an amount of 75 parts by weight to 95 parts by weight, a repeating unit derived from the (meth)acrylic acid alkoxy alkyl ester monomer is present in an amount of 4 parts by weight to 20 parts by weight, and a repeating unit derived from the crosslinkable monomer is present in an amount of 1 parts by weight to 10 parts by weight, based on 100 parts by weight of total repeating units.

2. The method of claim 1, wherein in preparing of the first acrylic-based copolymer, the first (meth)acrylic acid alkyl ester monomer is at least one of the group consisting of methyl (meth)acrylate, ethyl (meth)acrylate, propyl (meth)acrylate, isopropyl (meth)acrylate, n-butyl (meth)acrylate, isobutyl (meth)acrylate, n-amyl (meth)acrylate, isoamyl (meth)acrylate, n-hexyl (meth)acrylate, 2-ethylhexyl (meth)acrylate, and cyclohexyl (meth)acrylate, and the second (meth) acrylic acid alkyl ester monomer is at least one of the group consisting of hydroxy methyl (meth)acrylate, hydroxy ethyl (meth)acrylate, and hydroxypropyl (meth)acrylate.

3. The method of claim 1, wherein in preparing of the first acrylic-based copolymer, the first (meth)acrylic acid alkyl ester monomer is a combination of ethyl (meth)acrylate and n-butyl (meth)acrylate, and the second (meth)acrylic acid alkyl ester monomer is hydroxypropyl (meth)acrylate.

4. The method of claim 1, wherein in preparing of the second acrylic-based copolymer, the (meth)acrylic acid alkyl ester monomer is at least one of the group consisting of ethyl (meth)acrylate, propyl (meth)acrylate, isopropyl (meth)acrylate, n-butyl (meth)acrylate, isobutyl (meth)acrylate, n-amyl (meth)acrylate, isoamyl (meth)acrylate, n-hexyl (meth)acrylate, 2-ethylhexyl (meth)acrylate, and cyclohexyl (meth)acrylate.

5. The method of claim 1, wherein in preparing of the second acrylic-based copolymer, the (meth)acrylic acid alkyl ester monomer is a combination of ethyl (meth)acrylate and n-butyl (meth)acrylate.

6. The method of claim 1, wherein the (meth)acrylic acid alkoxy alkyl ester monomer in preparing of the first acrylic-based copolymer and preparing of the second acrylic-based copolymer is each independently at least one of methoxymethyl (meth)acrylate, ethoxymethyl (meth)acrylate, 2-ethoxyethyl (meth)acrylate, 2-butoxyethyl (meth)acrylate, 2-methoxyethyl (meth)acrylate, 2-propoxyethyl (meth)acrylate, 3-methoxypropyl (meth)acrylate, and 4-methoxybutyl (meth)acrylate.

7. The method of claim 1, wherein the (meth)acrylic acid alkoxy alkyl ester monomer in preparing of the first acrylic-based copolymer and preparing of the second acrylic-based copolymer is 2-methoxyethyl (meth)acrylate.

8. An acrylic-based copolymer composition prepared from the method of claim 1, the acrylic-based copolymer composition comprising:
   the first acrylic-based copolymer; and
   the second acrylic-based copolymer.

9. The acrylic-based copolymer composition of claim 8, wherein the first acrylic-based copolymer has a Mooney viscosity greater than that of the second acrylic-based copolymer.

10. The acrylic-based copolymer composition of claim 8, wherein a mixture in which the first acrylic-based copolymer and the second acrylic-based copolymer are mixed has a Mooney viscosity measured at $ML_{1+4}$ at 100° C., of 20 to 80.

11. The acrylic-based copolymer composition of claim 8, wherein the first acrylic-based copolymer has a weight average molecular weight of 150,000 g/mol to 1,100,000 g/mol.

12. The acrylic-based copolymer composition of claim 8, wherein the second acrylic-based copolymer has a weight average molecular weight of 50,000 g/mol to 900,000 g/mol.

13. An acrylic-based rubber composition comprising the acrylic-based copolymer composition of claim 8, wherein the acrylic-based rubber composition has a crosslinking density of 17.2 kgf•m or more.

14. An acrylic-based rubber composition comprising the acrylic-based copolymer composition of claim 8, wherein the acrylic-based rubber composition has a crosslinking density of 17.2 kgf•m to 18.5 kgf•m.

\* \* \* \* \*